Patented May 22, 1934

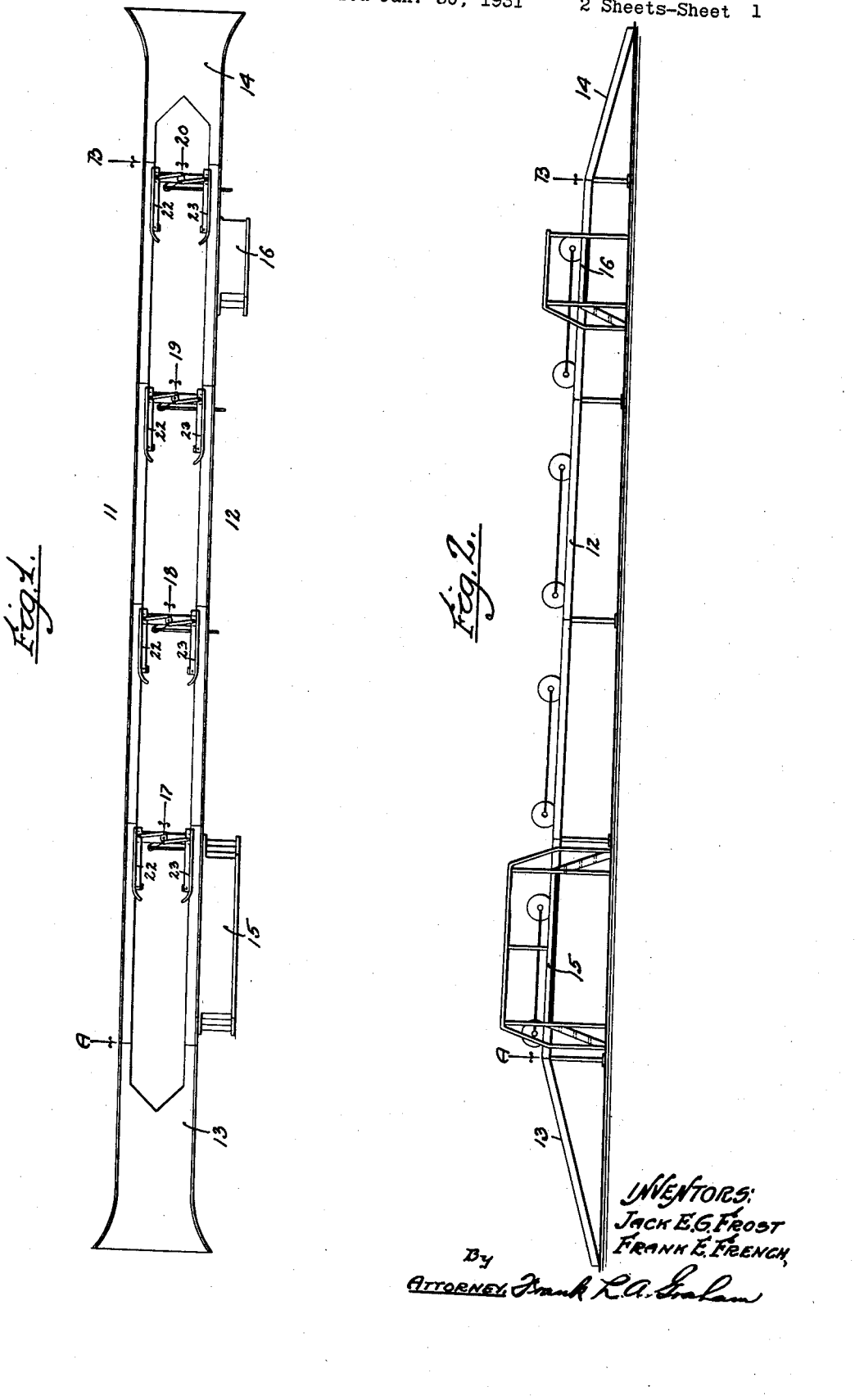

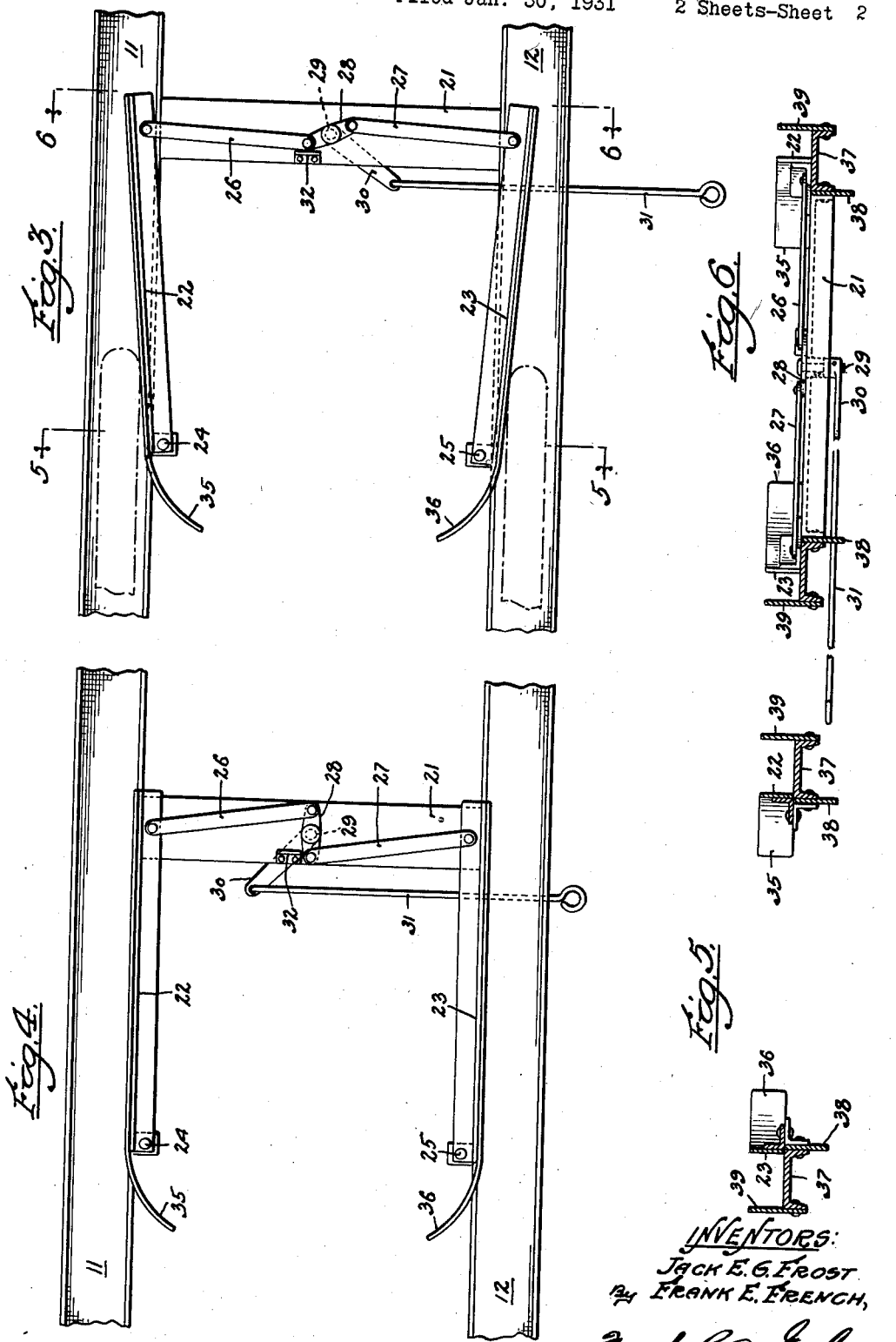

1,959,468

UNITED STATES PATENT OFFICE 1,959,468

SERVICE RACK FOR AUTOMOBILES AND THE LIKE

Jack E. G. Frost, Los Angeles, and Frank E. French, Inglewood, Calif.

Application January 30, 1931, Serial No. 512,294

5 Claims. (Cl. 238—4)

This invention relates to service racks, and deals particularly with a rack designed for use in greasing and/or washing automobiles and the like.

As a means toward the end of reducing the labor involved in greasing, washing, or otherwise servicing automobiles, many types of service racks have been devised. We are aware of racks which individually raise an automobile, and we are also aware of racks which are in the nature of a continuous elevated runway and have an endless chain means incorporated therewith for moving the cars along the runway.

The rack embodied in the present invention differs materially from the foregoing racks in that it comprises an inclined runway having a plurality of braking arrangements at successive stations for stopping an automobile as it progresses by its own weight down the runway. The stations may represent different stages of washing or greasing, and a rack of the foregoing characteristics may also be advantageously employed in an assembly plant, and the stations represent different points of assembling the car.

A rack of the foregoing characteristics is adapted to handle a plurality of cars in an elevated position, and is arranged in a manner to move the cars along said rack optionally at the will of the operator, without the use of a chain moving means, thus leaving the space between the runways clear.

Since the utility of a service rack resides in its ability to raise a car so that access may be had to the under part of the car, and in cases of greasing, particularly to the running gear of the car, it is obvious that a rack having a clear space beneath the body of the car and between the runways of the rack possesses advantages over a rack which is equipped with an endless chain member for moving the cars. Accordingly, it becomes an object of this invention to provide a service rack for the purpose described, wherein the space between the runways and beneath the car may be substantially unobstructed.

In servicing a car, such as washing or greasing, the car is mounted onto the inclined runway by means of its own power through any suitable ramp. It is then in a position to proceed by means of its own weight and the hereinbefore mentioned braking means through the successive stations. It, therefore, becomes another object of this invention to provide a service rack comprising inclined runways having braking means arranged at successive stations on said runway.

In the matter of the braking arrangements, we employ a novel and a simple means which consists of moving into the path of the wheels of the vehicle on the runway obstructing means which serve to stop and hold the vehicle at the point desired. Said obstructing means comprises a pair of obstructing members which are arranged to be simultaneously operated by a single operating means, and, if desirable, may be arranged to be power-operated with a remote control. It, therefore, becomes another object of this invention to provide in conjunction with the inclined runway a braking means of simple, durable, and efficient construction which may be manually operated or remotely operated by means of power.

Another object of this invention is to provide a service rack which is operable to move cars along a runway without the aid of any power means.

Other objects and advantages will become apparent as the description proceeds in conjunction with the drawings, in which—

Fig. 1 is a plan view of our rack;

Fig. 2 is a side elevation of the same;

Fig. 3 is an enlarged fragmentary view showing the braking arrangement in a closed position;

Fig. 4 is the same as Fig. 3, showing the braking arrangement in an open position;

Fig. 5 is a sectional view taken on line 5—5 of Fig. 3; and

Fig. 6 is a sectional view on line 6—6 of Fig. 3.

Referring to the drawings, and particularly to Fig. 2, we have shown a service rack composed of a pair of parallel tracks 11 and 12. The tracks are spaced to form a suitable runway for an automobile or the like, and are inclined from the point A to the point B downwardly so that vehicles placed thereon will roll from A to B under their own weight.

As a means of mounting the vehicles upon the tracks 11 and 12, an ascending ramp 13, formed of any suitable material, preferably having non-skid characteristics, extends from the level surface to the point A, and if desirable, a descending ramp 14 may lead from the point B to the level surface. Near the points A and B we have illustrated walkways 15 and 16, respectively, which may serve for an operator to stand upon while working upon a vehicle. It is to be understood that similar walkways may be built at any point deemed necessary.

On the inclined runway extending from A to B, we have incorporated a plurality of braking stations designated 17, 18, 19, and 20, which are arranged to stop and hold a vehicle at said points.

It is to be understood that in using a rack of this nature, the vehicle is mounted upon the upper end of the runway extending from A to B, and is allowed to descend the inclined runway by force of gravity until it arrives at any one of the stations which may be closed by the braking arrangement, whereupon it is held for an operation of any sort. It is apparent that after the operation has been performed at any one station, the braking arrangement may be released, and the vehicle automatically moves of its own weight toward the next succeeding station where it may again be stopped and held by a similar braking arrangement.

Referring more specifically to the braking arrangement in this invention, which is illustrated in Figs. 3 to 5, it is to be understood that the braking arrangement illustrated and described possesses novelty per se, and that this invention includes within its scope all means equivalent thereto.

As a means of mounting the braking arrangement, we install cross members 21 between the rails 11 and 12, said cross members serving not only as a means of spacing the rails, but also for mounting the braking arrangement.

As shown, the braking arrangement comprises wings 22 and 23 pivotally mounted at one end upon the rails 11 and 12, respectively, as shown at 24 and 25. The other end of the wings 22 and 23 is controlled by a link system comprising links 26 and 27 pivotally connected to the wings 22 and 23, respectively, said links in turn being pivotally connected at their other ends to a plate 28. The plate 28, in turn, is mounted upon a pin 29, which is pivotally carried in the cross member 21, and carries a handle-operating member 30 secured thereto. The operating member may be made for grasping by hand, or, as an alternative, a rod 31 may be connected to the member 30 and extended beyond the rails to provide remote means of operation. It is obvious that the rod 31 may be operated by power if desirable.

Means is provided for locking the brake in an expanded position, i. e., in a position where it holds the vehicles.

In Fig. 3, we have shown the brake in full lines in an expanded and a locked position for holding a vehicle, and in Fig. 4 in a closed position for passing a vehicle. The means for holding the brake locked in an expanded position preferably consists of an upstanding member 32 mounted on the cross member 21 in a manner to engage an end of the plate 28 after it has passed over center in expanding the wings 22 and 23. With the brake set in the position shown in Fig. 4, the vehicle would pass over the station without any obstruction, and would proceed on to the next station.

After the vehicle has been stopped, and it is desired to move the same to a succeeding station, the wings 22 and 23 are withdrawn to the position shown in Fig. 4, and the vehicle moves forwardly automatically.

In order to provide a sure passage of the vehicle wheels through the wings 22 and 23 when in the closed position, we may provide curved guide plates 35 and 36 upon the wings 22 and 23, respectively.

It is to be understood that braking stations of the type described may be incorporated at any points found desirable along the runway.

In Figs. 5 and 6 we have illustrated in combination one form of a rail that may be utilized in this invention. In these views the rail is shown as being formed of a channel iron 37, having an inner depending flange 38 and an outer upstanding flange 39 secured thereto. However, we do not wish to restrict ourselves to this particular form since fabricated forms of any type that will provide a runway for the purpose described may be utilized. No description of the structural support for a runway of this character has been entered, since it is obvious that any suitable support may be used, and would in no way be a part of this invention.

A rack of the foregoing characteristics lends itself readily to the purpose described, and provides a rack of simple construction having few parts, all of said parts being of a simple, durable, and inexpensive nature. Furthermore, it is a noteworthy feature of this invention that a service rack fulfilling all the requirements of racks of this character is provided wherein no power means is necessary for moving the vehicle along the tracks.

Although we have shown and described a single embodiment of our invention, nevertheless we are aware that modifications and refinements may be made therein without in any way departing from the spirit of the invention. We, therefore, reserve the right to all such substitution of parts that, under the doctrine of equivalents, come within the scope of the specification and the purview of the appended claims.

We claim as our invention:

1. A service rack for motor vehicles embodying: a pair of elevated inclined tracks adapted to support a vehicle in an elevated position; vehicle-holding members pivotally mounted on said tracks; and means for moving said members across the path of the wheels on a vehicle into engagement with the sides of the tread of the wheels.

2. A service rack for motor vehicles embodying: a pair of elevated inclined tracks adapted to support the wheels of a vehicle in an elevated position; a vehicle wheel-engaging member pivotally mounted on each of said tracks; and means for swinging said member across said track into a lateral wheel-engaging position to hold said vehicle against movement down the inclined track.

3. A service rack for motor vehicles embodying: a pair of elevated inclined tracks adapted to support the wheels of a vehicle in an elevated position; a vehicle wheel-engaging member pivotally mounted on each of said tracks; and means for simultaneously moving said members across said tracks into vehicle wheel-engaging positions to hold said wheels by lateral engagement against movement down the inclined tracks.

4. A service rack for motor vehicles embodying: a pair of inclined rails forming a track adapted to support the wheels of a vehicle; a pair of wheel engaging wings pivotally mounted on the edges of said rails, said wings being mounted with their free ends above points of lower elevation than the pivoted ends; and means for swinging the free ends of said wings across said tracks so as to form an engaging wedge having vertically extending faces engaging the sides of the wheels of the vehicle for locking said vehicle against movement down the inclined tracks.

5. A service rack for motor vehicles embodying: a pair of inclined rails forming a track adapted to support the wheels of a vehicle; a pair of wheel engaging wings pivotally mounted on the edges of said rails, said wings being mounted with their free ends above points of lower elevation than the pivoted ends; and means for swinging the free ends of said wings across said tracks so as to form an engaging wedge having vertically extending faces engaging the sides of the wheels of the vehicles for locking said vehicle against movement down the inclined tracks, the pivoted ends of said wings being provided with inwardly curved sections forming guides for said wheels.

JACK E. G. FROST.
FRANK E. FRENCH.